United States Patent Office 3,810,891
Patented May 14, 1974

3,810,891
PRODUCTION OF CYANURIC ACID
John M. Lee, Lake Jackson, Tex., assignor to The Dow Chemical Company, Midland, Mich.
No Drawing. Filed Apr. 7, 1972, Ser. No. 242,201
Int. Cl. C07d 55/36
U.S. Cl. 260—248 A                                8 Claims

ABSTRACT OF THE DISCLOSURE

This invention relates to cyanuric acid and more particularly, to an improved process for preparing cyanuric acid by the pyrolysis of urea or a urea pyrolyzate in an inert capped- or cyclic-polyether solvent at temperatures from about 160 to about 220° C. while sparging with an inert gas.

BACKGROUND OF THE INVENTION

(A) Field of the invention

The present invention is directed to an improved process for the production of cyanuric acid from urea or a urea pyrolyzate.

(B) Description of the prior art

It is well-known that when urea or a urea pyrolyzate is heated above its melting point, cyanuric acid is formed along with biuret, ammelide, and other urea autocondensation products depending upon the conditions of heating. Generally, the heating is carried out either in a dry state or in the presence of various inert solvents, such as described in U.S. Pat. 3,065,233, issued to Hopkins et al. on Nov. 20, 1962; U.S. Pat. 3,117,968, issued to Merkel et al. on Jan. 14, 1964; U.S. Pat. 3,164,591, issued to Walles et al. on Jan. 5, 1965; or, U.S. Pat. 3,563,987, issued to Sidney Berkowitz on Feb. 16, 1971.

In preparing cyanuric acid by pyrolyzing urea or a urea pyrolyzate, it is difficult to minimize the production of undesired autocondensation by-products. It is also difficult to obtain the desired cyanuric acid product in good yield and high purity. A cyanuric acid product of high purity is especially important where it is to be used as a raw material for other products. Hence, it is necessary to obtain a commercial product substantially free of pyrolytic autocondensation products of urea, and particularly of the amides of cyanuric acid, chiefly ammelide and ammeline.

In order to obtain a highly purified product, it is the custom in the art to treat crude cyanuric acid to an acid digestion in a strong, acid bath, e.g., 3–15% sulfuric or hydrochloric acid. This acid treatment selectively hydrolyzes the acid insoluble, cyanuric acid amides and converts them to cyanuric acid. Such procedures, usually employed where the concentration of cyanuric acid amide exceeds 1% by the weight of the cyanuric acid product, generally require several hours to complete and further require special, acid-resistant, holding tanks and centrifuges to hold the acid bath and separate the digested cyanuric acid from the mineral acid.

Other prior art procedures have avoided the acid digestion step by pyrolyzing urea under subatmospheric pressure conditions. Such procedures, however, require additional energy output to maintain the system under a vacuum and further can result in substantial loss of urea reactant due to sublimation.

For the foregoing reasons, it would be desirable to provide an improved process wherein a cyanuric acid product can be obtained in high yields and purity without the necessity of maintaining the process under a vacuum or subjecting the cyanuric acid product to an acid digestion step.

SUMMARY OF THE INVENTION

It has now been discovered that a urea or a urea pyrolyzate reactant can be converted to cyanuric acid with minimal amounts of impurities by heating urea or a urea pyrolyzate in capped- or cyclic-polyether solvents at atmospheric pressure and at elevated temperatures of at least about 160° C. The capped- or cyclic-polyether solvents must be capable of dissolving an appreciable amount of the urea or urea pyrolyzate reactant but must have only a limited solubility for cyanuric acid, and further must have a boiling point above about 160° C. at atmospheric pressure.

DESCRIPTION OF THE INVENTION AND THE PREFERRED EMBODIMENTS

In carrying out the present invention, a urea or a urea pyrolyzate reactant is dissolved in a suitable inert solvent. In order to be acceptable, the solvent must be capable of dissolving appreciable amounts of the urea or urea pyrolyzate reactant, and the final product, cyanuric acid, must be relatively insoluble therein. Additionally, the solvent must have a boiling point above about 160° C. and must not chemically react with urea, biuret, liberated ammonia or cyanuric acid.

Solvents which have advantageously been found effective in the present process include capped polyglycol ethers represented by the formula:

$$R'{-}O{-}(R{-}O)_n{-}R''$$

wherein $n$ is an integer of from 1 to 6;
R' and R" each independently represent lower alkyl group containing 1 to 3 carbon atoms as exemplified by methyl, ethyl and propyl; and
R is an ethylene or a propylene radical.

Of these solvents, those wherein $n$ represents an integer of 2 to 4, R' and R" each independently represent methyl or ethyl and R represents an ethylene or propylene radical, are preferred. Thus, an especially suitable and preferred class of solvents includes the following:

dimethyl ether of diethylene glycol;
diethyl ether of diethylene glycol;
dimethyl ether of triethylene glycol;
diethyl ether of triethylene glycol;
diethyl ether of tetraethylene glycol; and
dimethyl ether of tetraethylene glycol.

The dimethyl ether of tetraethylene glycol and the dimethyl ether of diethylene glycol are especially preferred solvents. Mixtures of two or more of the solvents described may be used instead of a single solvent. Another class of suitable solvents include the cyclic polyethers of ethylene oxide, i.e., the trimer, tetramer, pentamer, hexamer and the like up to the decamer and admixtures thereof. Preferably, the cyclic tetramer of ethylene oxide is employed as a solvent medium.

When a solution of urea or a urea pyrolyzate in a solvent such as described above is heated at temperatures from about 160 to about 220° C., ammonia is given off as the condensation reaction proceeds and the product, cyanuric acid, which is essentially insoluble in these solvents, is precipitated as a highly pure crystalline solid easily separable from the reaction mixture. By proper selection of temperature and time of heating, the condensation of urea or urea pyrolyzate to cyanuric acid may be run to substantial completion or it may be run to a predetermined degree of completion, as indicated by monitoring the liberation of ammonia. In either case, the precipitated cyanuric acid is easily separated from the mixture by filtration and the solvent recycled to the process. If desired, the solvent may be removed by distillation, leaving the product as a residue. The product obtained may be purified by recrystallization from hot water, thus removing any minor amounts of insoluble ammelide and ammeline. The removal of liberated ammonia from the reaction flask can be accomplished by purging the reaction flask with an inert gas, such as, for example, nitrogen.

The progress of the reaction is easily followed by the evolution of ammonia from the reaction mixture. Preferably, the heating is ceased when the evolution of ammonia has substantially ceased. The rate of reaction is somewhat dependent upon the temperature to which the reaction solution is heated, but generally, a reaction period of from about 1 to about 24 hours at temperatures from about 160–220° C. is sufficient to convert a major proportion of the urea or urea pyrolyzate to cyanuric acid. Generally, temperatures from about 180 to about 220° C. are preferably employed. An especially preferred temperature range is from about 190 to about 215° C. At temperatures of about 190–215° C., cyanuric acid can be prepared in shorter reaction periods of from 1 to about 12 hours, usually in about 5 hours or less, in amounts of about 95% or more. High yields of cyanuric acid are also obtained in shorter reaction periods of about 1 to about 3 hours at higher temperatures of from about 190–215° C. when cyclic polyether solvents are employed.

The following examples are given to illustrate the invention and are not deemed to be limiting thereof.

EXAMPLE 1

Run No. 1

A glass flask equipped with a stirrer, thermometer, reflux condenser, nitrogen purge and heating mantle was charged with 245 grams of the dimethyl ether of diethylene glycol and 25 grams of urea. The solution, with stirring, was heated under reflux conditions at temperatures of about 180° C. for a total period of about 10 hours while sparging with nitrogen. The course of the reaction was monitored by passing the reaction and sparge gases through standardized sulfuric acid. Following the reaction period, the glycol mixture was filtered and the precipitate washed with ethyl ether and dried. About 14.3 grams of dried cyanuric acid product were recovered; this constituted about an 80% yield, based on the urea charged to the flask. Upon analysis of the product by titration with standard base (0.1 NaOH), the product was identified as 96.8% pure cyanuric acid. The remaining impurities in the cyanuric acid product were mainly urea, with only minor amounts of biuret, triuret, ammelide and ammeline. The titration was performed by titrating about 0.5 gram of product, to a phenolphthalein end point, using 0.1 N NaOH solution. Cyanuric acid is a mono-basic acid under these conditions, thus mole-weight is the same as equivalent weight.

Runs 2–10

Additional runs were made according to the above procedures using sufficient amounts of urea or urea pyrolyzate reactant to provide reaction mixtures of the percent solids density indicated in the following Table I. The reaction time and degree of reaction completion as indicated by the moles of evolved ammonia, temperatures, type of solvent and assay of cyanuric acid obtained are also listed in Table I.

TABLE I

| Run number | Time, hrs. | Percent solids | Temp., ° C. | Solvent* | Cyanuric acid in product | Moles NH₃ per urea |
|---|---|---|---|---|---|---|
| 2 | 11.0 | 9.3 | 180 | 1 | 96.8 | .964 |
| 3 | 22.0 | 17.8 | 182 | 1 | 96.5 | .905 |
| 4 | 5.0 | 27.6 | 210 | 1 | 94.8 | .932 |
| 5 | 2.0 | 25.8 | 215 | 2 | 97.4 | .955 |
| 6 | 1.5 | 28.8 | 215 | ᶜ2 | 95.0 | .947 |
| 7 | 8.0 | ᵃ20.0 | 197 | 1 | 95.6 | |
| 8 | 10.0 | ᵇ18.9 | 197 | 1 | 96.2 | |
| 9 | 7.25 | 38.3 | 214 | ᵈ1 | 96.6 | .98 |
| 10 | {2.5 / 6.3 / 6.3} | 9.9 | {165 / 165 / 180} | 1 | {45.0 / 53.0 / 94.2} | .618 / .764 / .89 |

ᵃ Urea pyrolyzate reactant comprising 29% urea, 56.5% biuret, 9.1% cyanuric acid and 3.3% triuret.
ᵇ Urea pyrolyzate reactant comprising 44.6% urea, 43.4% biuret, 10.3% cyanuric acid and 1.3% triuret.
ᶜ Solvent recycled from Run No. 5.
ᵈ Solvent recycled from Run No. 8.
* Solvent 1 was tetraethylene glycol dimethyl ether. Solvent 2 was a cyclic tetramer polyether of ethylene oxide.

The capped polyether solvents employed in the present invention are known and can be prepared by methods known in the literature or readily obtained from commercial sources. The cyclic ethers of ethylene oxide are prepared according to methods known in the literature. See, for example, The American Chemical Society Monograph No. 114 entitled "Glycols," edited by George O. Curme, Jr. and Franklin Johnston (1952, Reinhold Publishing Corp., pp. 197–277). Cyclic ethers of ethylene oxide are also readily prepared by heating ethylene oxide at a temperature of 30°–80° C. in the presence of 0.001–0.2 percent by weight of a fluoroborate or borontrifluoride catalyst.

The urea pyrolyzate reactants employed in the present process usually contain predominate amounts of urea and biuret and small amounts of other urea autocondensation products such as cyanuric acid, triuret and the like. Generally, the urea pyrolyzate reactants have a biuret content of up to about 55 percent or more and a urea content of up to about 40% or more. A variety of means to prepare the urea pyrolyzates can be employed. For example, urea can be partially pyrolyzed by heating at a temperature of from about 150° to about 210° C., preferably at from about 160° to about 185° C. and maintained within this temperature range for a period of from about 10 minutes to about 6 hours followed by staged cooling, either in a step-wise progression or continuously to a temperature of from about 110° to about 130° for a period sufficient to provide a pyrolyzate product having a biuret content of up to about 55 weight percent or more, the remainder being predominately urea.

The urea reactant also can be prepared by pyrolyzing urea in a falling film reactor to provide a pyrolyzate having a biuret content of up to about 40 weight percent or more, usually from about 20 to about 40 weight percent. In such a process a molten urea feedstock or aqueous urea solution is introduced at a flow rate into a falling film reactor maintained at a temperature to provide a pyrolyzate produce exit temperature of form about 180° to about 240° C. and preferably from about 195° to about 230° C. Ordinarily the urea feed material feed rate is from about 180 to about 600 pounds of actual urea compound/hour/foot of reactor periphery (lb./hr./ft.). Preferably, a flow rate of from about 430 to about 520 lb./hr./ft. is employed with the reactor temperature being maintained to produce a pyrolyzate product having an exit temperature of from about 215° to about 225° C.

The urea pyrolyzate reactants can also be a partially pyrolyzed autocondensation product produced by any of a variety of conventional prior art processes.

The foregoing examples illustrate a number of ways in which the process of the present invention may be operated advantageously and many other embodiments are possible. These examples, therefore, are not to be inter-

What is claimed is:

1. In a process for preparing cyanuric acid by heating a compound selected from the group consisting of urea and partially pyrolyzed urea in an inert solvent at a temperature of at least 160° C. for a reaction period sufficient to produce a substantial amount of cyanuric acid and recovering said cyanuric acid, the improvement comprising the employment as said insert solvent a solvent selected from group consisting of (a) capped polyglycol ethers represented by the formula:

$$R'-O-(R-O)_n-R''$$

wherein:
$n$ is an integer of from 1 to 6, R' and
R" each independently represent a lower alkyl group containing 1 to 3 carbon atoms, and R is ethylene or propylene, and mixtures thereof
and (b) cyclic polyethers of ethylene oxide, containing from 3 to 10 recurring ethylene oxide units, and admixtures thereof.

2. The process of claim 1 wherein the inert solvent is the dimethyl ether of tetraethylene glycol.

3. The process of claim 1 wherein the inert solvent is the dimethyl ether of diethylene glycol.

4. The process of claim 1 wherein the inert solvent is the cyclic tetramer polyether of ethylene oxide.

5. The process of claim 1 wherein the compound is urea.

6. The process of claim 1 wherein the compound is a urea pyrolyzate.

7. The process of claim 1 wherein said heating is conducted at temperatures of from about 180 to about 220° C.

8. The process of claim 1 wherein said heating is conducted at temperatures of from about 190 to about 215° C. until the evolution of ammonia substantially ceases.

References Cited
UNITED STATES PATENTS 2,95,177    3/1961    Christmann _____ 260—248

JOHN M. FORD, Primary Examiner